United States Patent
Lin et al.

(10) Patent No.: US 12,554,831 B2
(45) Date of Patent: Feb. 17, 2026

(54) WHITELISTING METHOD FOR BLOCKING SCRIPT-BASED MALWARE

(71) Applicant: DELTA ELECTRONICS, INC., Taoyuan (TW)

(72) Inventors: Yi-Hui Lin, Taoyuan (TW); Kun-Ying Lin, Taoyuan (TW); Chia-Lin Liang, Taoyuan (TW); Lap-Chung Lam, Taoyuan (TW); Tzi-Cker Chiueh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 61 days.

(21) Appl. No.: 18/457,852

(22) Filed: Aug. 29, 2023

(65) Prior Publication Data

US 2024/0411858 A1    Dec. 12, 2024

(30) Foreign Application Priority Data

Jun. 12, 2023 (CN) .......................... 202310690345.3

(51) Int. Cl.
*G06F 21/51* (2013.01)
*G06F 21/54* (2013.01)

(52) U.S. Cl.
CPC .............. *G06F 21/51* (2013.01); *G06F 21/54* (2013.01); *G06F 2221/033* (2013.01)

(58) Field of Classification Search
CPC ............................................. G06F 21/50–577
See application file for complete search history.

(56) References Cited

U.S. PATENT DOCUMENTS

| 8,950,007 | B1* | 2/2015 | Teal | ........................ | H04L 63/20 726/30 |
| 2006/0150256 | A1* | 7/2006 | Fanton | .................... | H04L 63/10 726/27 |

(Continued)

FOREIGN PATENT DOCUMENTS

| CN | 102999721 A | 3/2013 |
| CN | 110232276 A | 9/2019 |

(Continued)

OTHER PUBLICATIONS

Search Report dated Jan. 10, 2024 of the corresponding PCT patent application No. PCT/CN2023/132561.

*Primary Examiner* — Trong H Nguyen
(74) *Attorney, Agent, or Firm* — MUNCY, GEISSLER, OLDS & LOWE, P.C.

(57) ABSTRACT

A whitelisting method for blocking script-based malware includes steps of: checking a command line of a process to confirm a first interception point that the process launches a startup script file; checking whether the startup script file in a whitelist at the first interception point; determining that a test is passed when the startup script file exists in the whitelist, and launching the startup script file, wherein the startup script file at least includes a module script file; confirming a second interception point that the process invokes a module loader to import and launch the module script file; checking whether the module loader is allowed to import the module script file, or is allowed to launch the module script file that has been imported by using the whitelist at the second interception point.

12 Claims, 5 Drawing Sheets

(56) References Cited

U.S. PATENT DOCUMENTS

2013/0097708 A1\* 4/2013 Jayanthi ............... H04L 63/145
                                                        726/25
2018/0307840 A1\* 10/2018 David .................. H04L 63/101
2019/0265994 A1\* 8/2019 Tas ....................... G06F 21/566

FOREIGN PATENT DOCUMENTS

| CN | 114186239 A | 3/2022 |
| CN | 115509687 A | 12/2022 |
| KR | 101752386 B1 | 7/2017 |

\* cited by examiner

WHITELISTING METHOD FOR BLOCKING SCRIPT-BASED MALWARE

BACKGROUND

Technical Field

The present disclosure relates to a whitelisting method, and more particularly to a whitelisting method for block script-based malware.

Description of Related Art

The statements in this section merely provide background information related to the present disclosure and do not necessarily constitute prior art.

There are currently various whitelisting methods and software known to help users in blocking malicious programs within their system, such as Application Whitelisting (AWL), Kaspersky, Fapolicyd, and products developed by Ivanti, and so on.

The application whitelist can only meet the protection for general malicious programs. Kaspersky can only provide protection for the entire configuration of the interpreter process and cannot provide protection for the individual script in the application control function. Fapolicyd and similar software (such as Trellix) cannot detect malicious scripts without a shebang. The products developed by Ivanti cannot detect malicious scripts without file extensions.

In view of this, there is a practical need in the market to provide a novel whitelisting method that can meet users' demand for blocking various script-based malicious programs.

SUMMARY

An objective of the present disclosure is to provide a whitelisting method for blocking script-based malware, which can detect and block the execution of script-based malware in the process.

In order to achieve the objective, the whitelisting method for blocking script-based malware includes steps of: (a) checking a command line of a process to confirm a first interception point that the process launches a startup script file, (b) checking whether the startup script file in a whitelist at the first interception point, (c) determining that a test is passed when the startup script file exists in the whitelist, and launching the startup script file, wherein the startup script file at least includes a module script file, (d) confirming a second interception point that the process invokes a module loader to import and launch the module script file, and (e) checking whether the module loader is allowed to import the module script file, or is allowed to launch the module script file that has been imported by using the whitelist at the second interception point.

Compared with related technologies, the present disclosure can detect whether a file is a script-based file when a process (such as an interpreter process) reads and launches the file, and determine whether the file exists in the whitelist. In this way, the execution of script-based malicious programs is effectively blocked.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
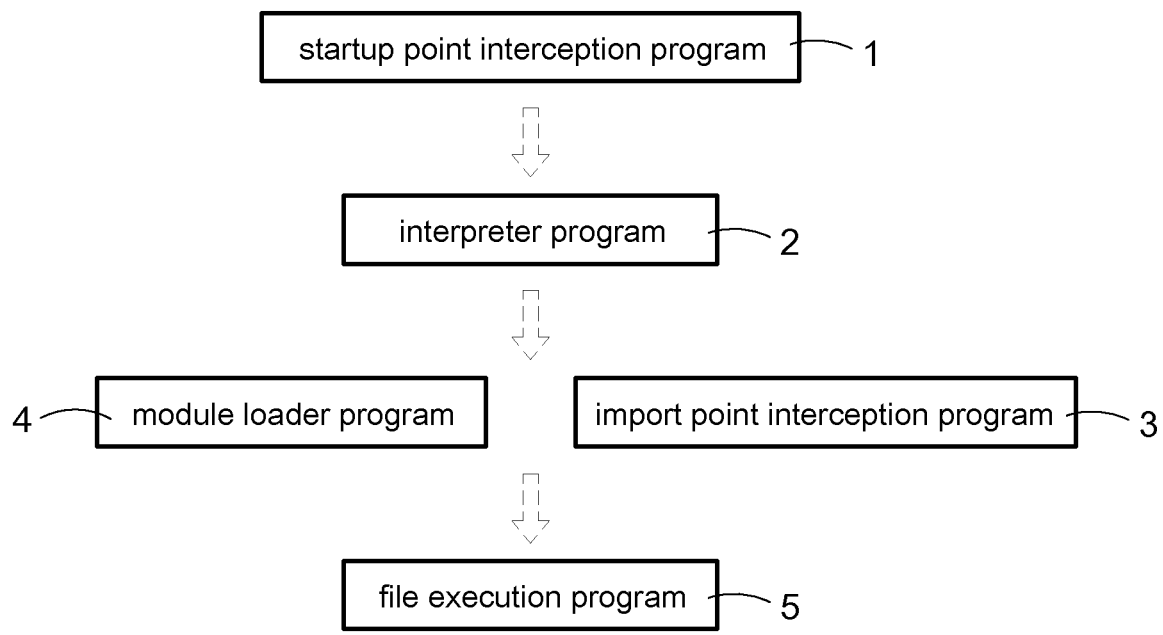
FIG. 1 is an architecture diagram of a detection system according to the present disclosure.

Reference will now be made to the drawing figures to describe the present disclosure in detail. It will be understood that the drawing figures and exemplified embodiments of present disclosure are not limited to the details thereof.

The present disclosure provides a whitelisting method for blocking a script-based malware. The whitelisting method, referred to as such in the following description, is primarily applied to a Linux system, but is not limited to this.

Specifically, the whitelisting method of the present disclosure can be used to identify whether a process is to launch an unapproved script or extract data from a pre-approved script when performing file launching or file reading in the process. When the process is to launch the unapproved script, the script is compared with a whitelist to determine whether the process is allowed to launch the script, thereby blocking script-based malware by the whitelist.

The whitelisting method of the present disclosure is activated at two interception points in the process, including: (1) a first interception point that occurs before a startup script file is launched, and (2) a second interception point occurs that the startup script file is continuously executed, and until a module loader needs to be executed to import and launch a module script file of the startup script file. The whitelisting method of the present disclosure is provided to check the whitelist for the script file (including the startup script file and the module script file) at the first interception point and the second interception point to confirm whether the process is allowed to import and launch the script file.

Please refer to FIG. 1, which shows an architecture diagram of a detection system according to the present disclosure. In the embodiment of FIG. 1, the detection system includes a startup point interception program 1, which is applied to the first interception point, an interpreter program 2, which is used to launch the startup script file, an import point interception program 3, which is applied to the second interception point, a module loader program 4, which is used to import the module script file, and a file execution program 5, which is used after the test is passed.

Specifically, users may use electronic devices such as personal computers, laptop computers, rack servers, or cloud servers to run the Linux system, and the corresponding firmware is configured in electronic circuits, such as central processing units or microprocessors, of the electronic devices. The functions achievable through the integration of electronic circuits and firmware allow electronic devices to virtually divide the firmware code into the aforementioned programs 1-5. In other words, in the present disclosure, the aforementioned programs 1-5 are all firmware programs. When any electronic device executes the firmware described, the whitelisting method of the present disclosure can be implemented by using the programs 1-5 (including the individual program steps shown in FIG. 2 to FIG. 5).

In one embodiment, the interpreter program 2, the module loader program 4, and the file execution program 5 may be implemented by an interpreter process and a module loader, but is not limited.

Figure 2:
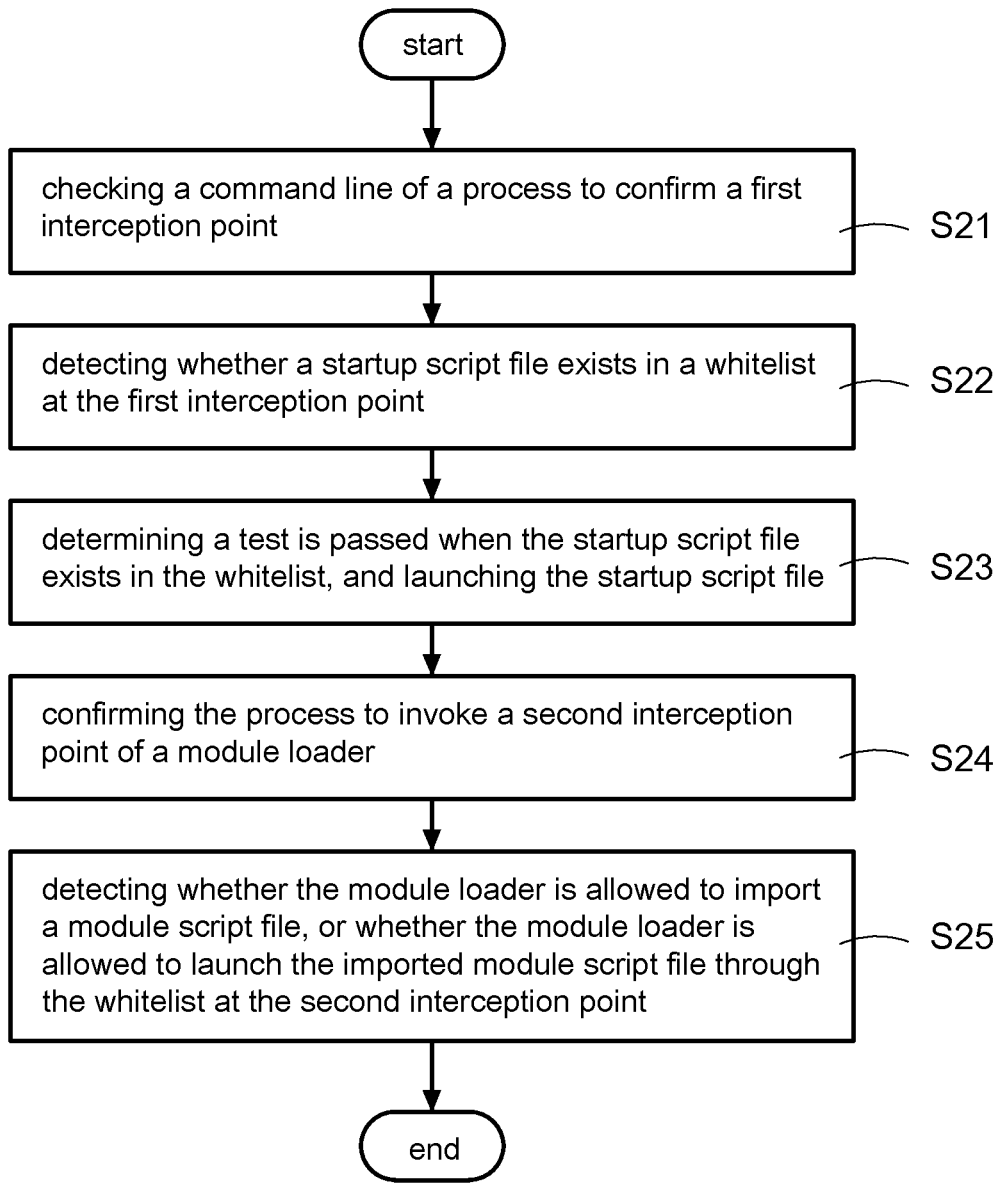
FIG. 2 is a flowchart of a whitelisting method according to the present disclosure.

Please refer to FIG. 2, which shows a flowchart of a whitelisting method according to the present disclosure, and also refer to FIG. 1. In one embodiment, the steps shown in FIG. 2 are jointly implemented by the programs 1-5 shown in FIG. 1.

As shown in FIG. 2, when a process is to be executed in the Linux system, the startup point interception program 1 first checks a command line of the process to confirm the first interception point that the process launches the startup script file (step S21). Specifically, the whitelisting method of the present disclosure executes a process command line hooking at the first interception point to check the startup script file before the startup script file is launched in the process.

After the step S21, the startup point interception program 1 detects whether the startup script file to be launched exists in the whitelist (step S22). In one embodiment, the whitelist is pre-established and information such as the type, list, or file name of the script file that is allowed to launch is recorded, but is not limited.

In one embodiment, the process is an interpreter process that is used to launch a script-based file. In the step S21, the startup point interception program 1 directly checks whether the command line of the interpreter process contains the corresponding command to launch the startup script file. In this way, it is to confirm the first interception point before the interpreter process launches the startup script file, and check the whitelist for the startup script file at the first interception point.

If the startup point interception program 1 determines that the startup script file exists in the whitelist, it means that the startup script file is not malware. In this condition, the startup point interception program 1 can determine the detection of the startup script file is passed, and the Linux system can then use the interpreter program 2 (such as the interpreter process) to launch the startup script file (step S23).

After the process launches the startup script file, the startup script file is continuously executed. The startup script file may need to further import a data file, or import and launch the module script file, that is, the startup script file may include at least one module script file. In order to prevent the module script file from being the malware and damaging the system after being imported, the whitelisting method of the present disclosure also needs to perform a second detection at the second interception point.

As mentioned in FIG. 2, after the step S23, the Linux system uses the import point interception program 3 to confirm a second interception point that the process invokes module loader to import and launch the module script file (step S24).

Specifically, when the startup script file is continuously executed by the process until another file needs to be launched, the startup script file will request the interpreter process to launch the file. In this condition, the interpreter process needs to execute the module loader to import the file required to be launched. In the present disclosure, the import point interception program 3 defines the time for executing the module loader as the second interception point. At the second interception point, it is to detect whether the module loader is allowed to import the module script file, or whether the module loader is allowed to launch the imported module script file through the whitelist (step S25).

In one embodiment, the whitelisting method executes a module loader hooking at the second interception point to check the module script file before the module loader imports the module script file.

In one embodiment, the whitelisting method executes an open function hooking at the second interception point to confirm that the module loader is allowed to launch the module script file by checking a file extension of the module script file before the module loader launches the imported module script file through an open function, and details will be provided later.

When the import point interception program 3 determines that the module loader can import the module script file at the second interception point, the Linux system imports the module script file through the module loader program 4. On the other hand, when the import point interception program 3 determines that the module loader is allowed to launch the imported module script file at the second interception point, the Linux system launches the module script file through the file execution program 5.

In particular, depending on the type of interpreter process, a module loader using a restricted file extension (i.e., an extension-restricted module loader) or a module loader using an agnostic file extension (i.e., an extension-agnostic module loader) may be used. For example, if the interpreter process is Shell script, Bash script, or JavaScript with CommonJS, the module loader using the agnostic file extension will be used. If the interpreter process is Python, Perl, PHP, Lua, or JavaScript with ES module, the module loader using the restricted file extension (such as .py or .pm) will be used.

In the present disclosure, if the process uses the module loader using the agnostic file extension, the import point interception program 3 needs to directly determine whether the module loader is allowed to import the module script file on the surface layer. If the process uses the module loader using the restricted file extension, the import point interception program 3 can determine whether the module script file is allowed to launch on the bottom layer after the module script file is imported, and details will be provided later.

The various types of the above-mentioned process are common technical means in the present disclosure, and the detail description is omitted here for conciseness.

Figure 3:
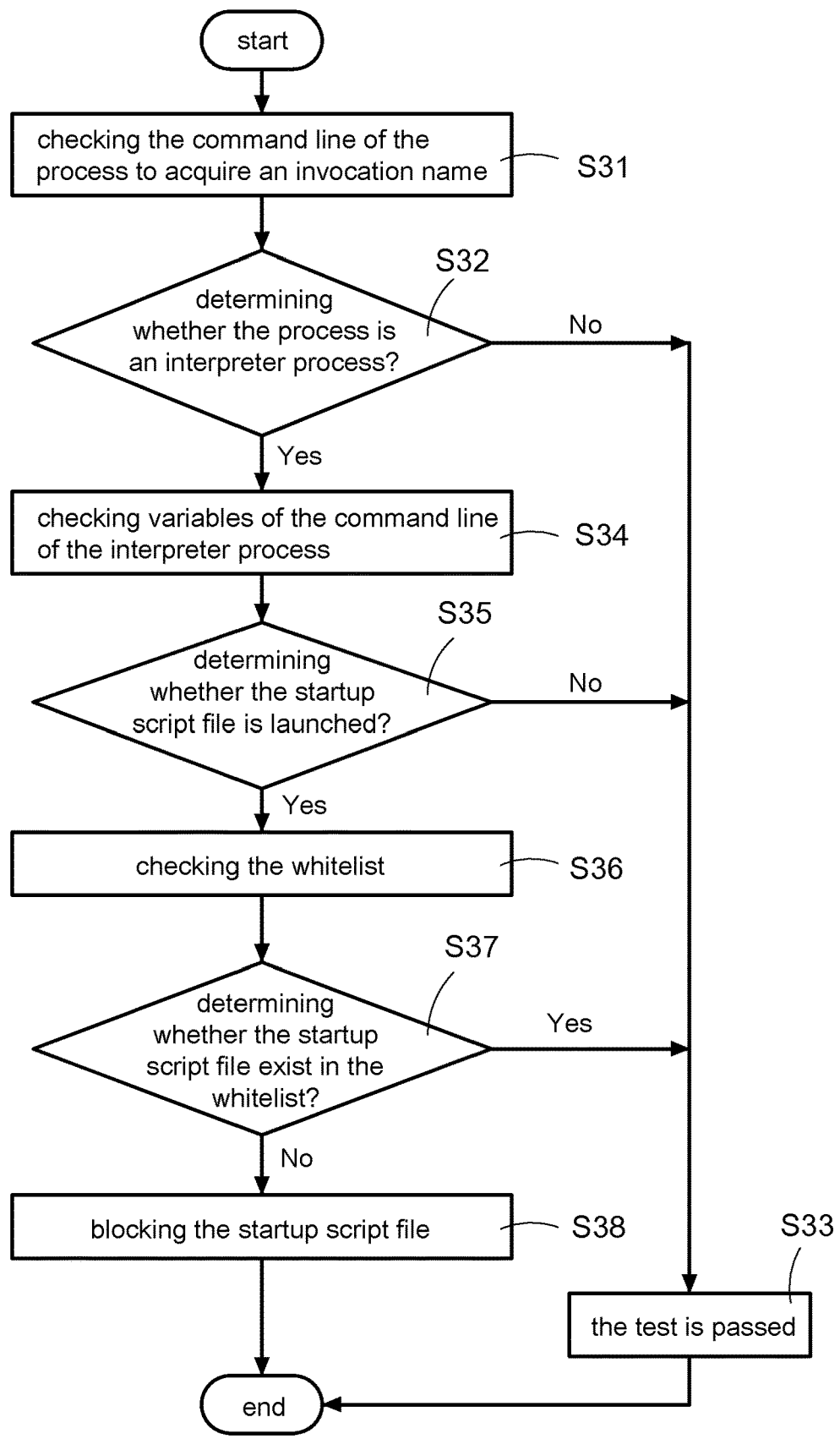
FIG. 3 is a flowchart of a method of detecting a first interception point according to the present disclosure.

Please refer to FIG. 3, which shows a flowchart of a method of detecting a first interception point according to the present disclosure. FIG. 3 is used to illustrate how the startup point interception program 1 determines whether the process can launch the startup script file at the first interception point.

As shown in FIG. 3, the startup point interception program 1 first checks the command line of the process to acquire the invocation name of the process (step S31), and determines whether the process is an interpreter process for executing a script-based file (such as a startup script file) by the invocation name (step S32).

If the process is not the interpreter process in the step S31, the startup point interception program 1 can directly determine that the test is passed (step S33) since it is unrelated to the script file that need to be blocked (i.e., the script file for blocking target), and then the whitelisting method ends.

If the process is the interpreter process in the step S31, the startup point interception program 1 then checks variables of the command line of the interpreter process (step S34) to determine whether the interpreter process launches the startup script file (step S35), and confirms the first interception point. If no file variable in the command line in the step S35, it means that the interpreter has no script file to launch. In this condition, the startup point interception program 1 can directly determine that the test is passed (step S33) since it is unrelated to the script file that need to be blocked, and then the whitelisting method ends.

Specifically, in the step S34, the startup point interception program 1 can determine whether variables of the command line of the interpreter process include a file path and a file name of the startup script file. If variables of the command line include the file path and the file name of the startup script file, the startup point interception program 1 can determine that the interpreter process will launch the startup script file so as to confirm the first interception point before the startup script file is launched.

After confirming that the interpreter process will launch the startup script file, the startup point interception program 1 can check the whitelist (step S36), and determine whether the startup script file exist in the whitelist (step S37). If the startup script file exists in the whitelist, it means that startup script file is not malware, and therefore the startup point interception program 1 can determine that the test is passed (step S33). In this condition, the interpreter process can launch the startup script file.

If the startup script file does not exist in the whitelist in the step S37, it means that the startup script file may be script-based malware. In this condition, the startup point interception program 1 blocks the startup script file (step S38), and therefore the interpreter process cannot launch the startup script file according to the command line. In this way, it is possible to prevent the Linux system from being damaged by launching the script-based malware.

In one embodiment, every file (including the startup script file) launched by the interpreter process has metadata. If a file exists in the whitelist, the metadata of the file will be given a whitelist tag. In one embodiment, when the startup point interception program 1 checks the metadata of the startup script file and confirms that the metadata contains the whitelist tag corresponding to the whitelist, it is determined that the startup script file exists in the whitelist.

In other embodiments, the whitelist can record information such as the type and the file name of multiple process files that have been determined not to be malicious programs. The startup point interception program 1 can determine that the startup script file exists in the whitelist when the type and the file name of the startup script file match the type and the file name of any process file recorded in the whitelist.

However, the above is only one specific implementation example of the present disclosure, but not limited thereto.

Figure 4:
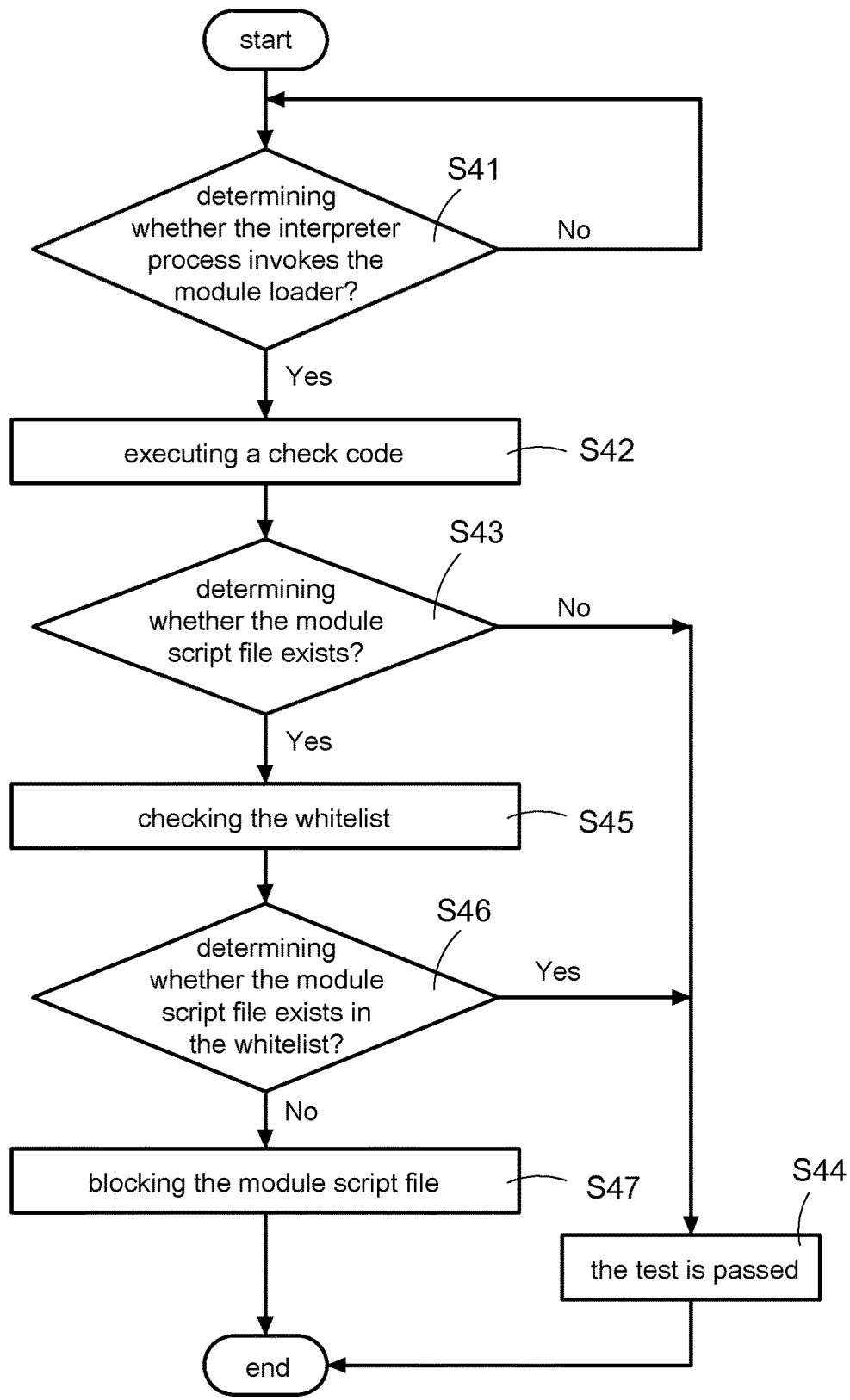
FIG. 4 is a flowchart of a method of detecting a second interception point according to a first embodiment of the present disclosure.

Please refer to FIG. 4, which shows a flowchart of a method of detecting a second interception point according to a first embodiment of the present disclosure. FIG. 4 is used to specifically explain how the import point interception program 3 determines whether the module loader can import the module script file at the second interception point.

As shown in FIG. 4, after the interpreter process launches the startup script file, the interpreter process continuously executes the startup script file, and the import point interception program 3 continuously determines whether the interpreter process invokes the module loader (step S41), that is, the import point interception program 3 continuously determines whether the startup script file requests the interpreter process to import and launch the module script file.

If the interpreter process does not invoke the module loader, it means that no script file needs to be imported and launched. When the interpreter process needs to invoke the module loader, the import point interception program 3 first executes additional check code (step S42) so as to confirm the second interception point before the module loader imports the module script file.

In one embodiment, the interpreter process is the interpreter of the module loader using the agnostic file extension, such as Bash script, Shell script, or so on, and therefore the import point interception program 3 needs to first check the module script file to be imported on the surface layer.

It is well known to those skilled in the art that the present disclosure belongs to, the interpreter process will provide an environment variable. In the present disclosure, the environment variable is edited and modified so that the interpreter process can enter a check program logic shown in FIG. 4, that is, a program for checking the module script file. In the step S42, the import point interception program 3 can determine whether the module loader is invoked by reading the environment variable in the interpreter process, and intercept a module loading instruction or syntax so as to rewrite the module loader. In this way, the interpreter process can subsequently execute the check code based on the intercepted and rewritten module loader, and then check.

After the check code is executed, it can be determined whether the module script file to be imported by the module loader exists (step S43). If the module script file to be imported does not exists, there is no problem of malicious programs, and therefore the import point interception program 3 can directly determine that the test is passed (step S44), and then the whitelisting method ends. If it is confirmed that the module script file exists according to the check code, the import point interception program 3 further checks the whitelist (step S45), and determines whether the module script file exists in the whitelist (step S46).

If the module script file exist exists in the whitelist, it means that the module script file is not malware, and therefore the import point interception program 3 can determine that the test is passed (step S44). In this condition, the interpreter process can import the module script file through the module loader.

If the module script file does not exist in the whitelist in the step S46, it means that the module script file may be script-based malware. In this condition, the import point interception program 3 blocks the module script file (step S47), and therefore the interpreter process cannot import the module script file through the module loader. In this way, the interpreter process can be prevented from importing malicious script files hidden in approved startup script files to cause damage to the Linux system.

In one embodiment, the check code in the step S42 is mainly used to intercept and rewrite the module loading instruction or syntax (such as the source command of shell script, the require syntax of commonJs of JavaScript, or so on) of the module loader executed by the interpreter process so as to determine what the module script file and whether the module script file exists based on the content of the command in the step S43.

In particular, the embodiment shown in FIG. 4 is an interception point executed on the surface layer of the process. Therefore, it is possible to perform detection before the module loader actually imports the module script file, and the import of the module script file is directly blocked when it is determined that the module script file may be malware.

Figure 5:
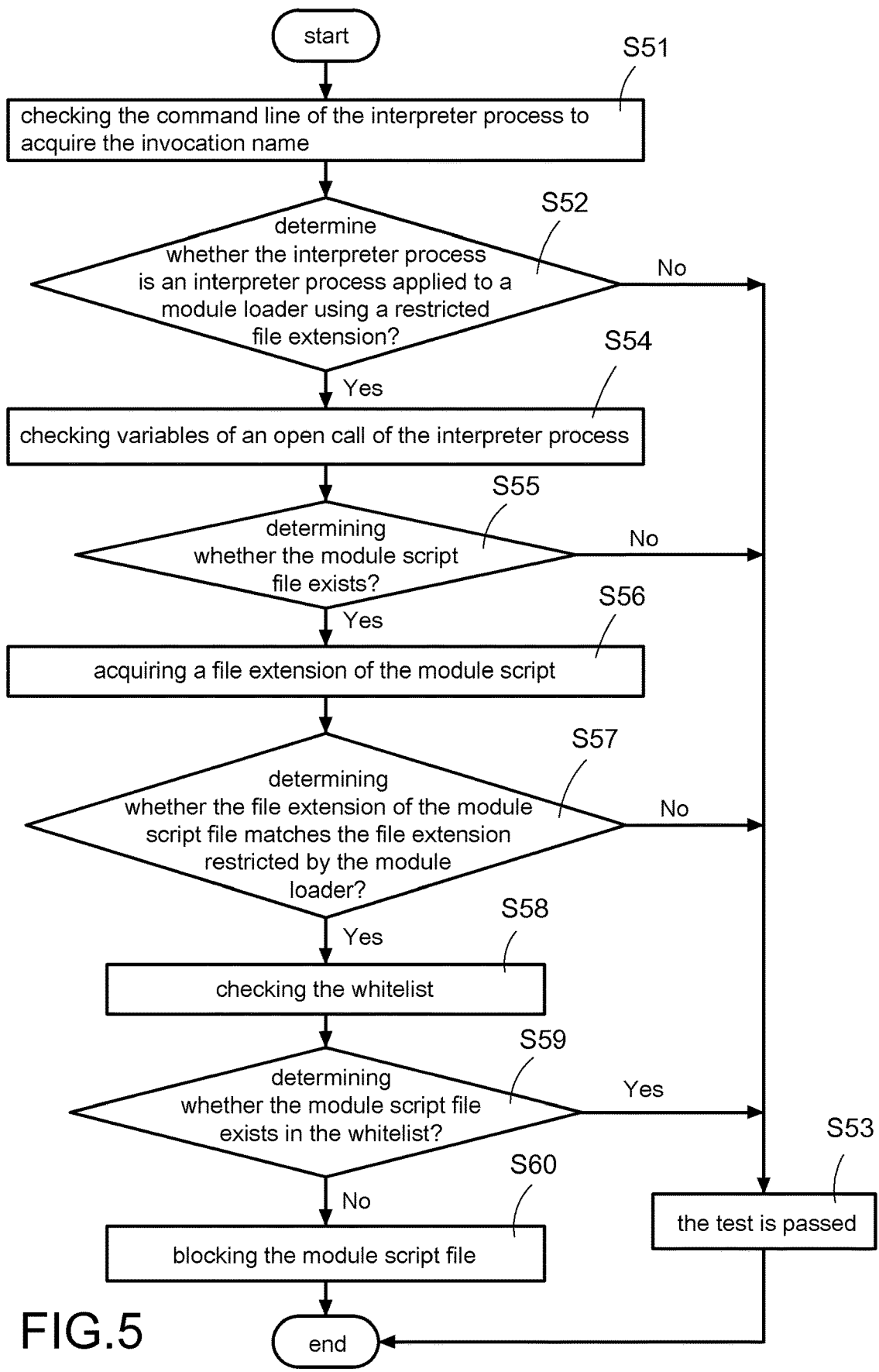
FIG. 5 is a flowchart of a method of detecting the second interception point according to a second embodiment of the present disclosure.

Please refer to FIG. 5, which shows a flowchart of a method of detecting the second interception point according to a second embodiment of the present disclosure. FIG. 5 is used to specifically explain how the import point interception program 3 determines whether the interpreter process can launch the imported module script file. Compared with the embodiment shown in FIG. 4, the embodiment shown in FIG. 5 is mainly used to execute the interception point on the bottom layer of the process, and check the module script file before the module script file is launched based on the open function.

Specifically, the embodiment shown in FIG. 5 is an interpreter process applied to a module loader using the restricted file extension. Therefore, at the second interception point, the import point interception program 3 first checks the command line of the interpreter process to acquire the invocation name of the process (step S51), and determine whether the interpreter process is an interpreter process applied to a module loader using the restricted file extension by the invocation name (step S52).

If the interpreter process is not an interpreter process applied to the module loader using the restricted file extension in the step (S52), the import point interception program 3 can directly determine that the test is passed (step S53) since the file extension of the script file to be launched cannot be determined, and then the whitelisting method ends.

If the interpreter process is an interpreter process applied to the module loader (for example, but not limited to, Python, Perl, PHP, Lua, or JavaScript with Es module) using the restricted file extension in the step (S52), the import point interception program 3 checks variables of an open call of the interpreter process (step S54), and confirms the second interception point.

In particular, in the step S31 shown in FIG. 3, the startup point interception program 1 is an invocation name for a surface layer check interpreter process. In the step S51 shown in FIG. 5, the import point interception program 3 is an invocation name for a bottom layer check interpreter process. In one embodiment, the startup point interception program 1 may pass information from the surface layer to the bottom layer through a value transmission action after acquiring the invocation name of the interpreter process. In this condition, the import point interception program 3 does not need to check the invocation name of the interpreter process at the second interception point, that is, the step S51 is not necessarily executed.

However, the above is only one specific implementation example of the present disclosure, but not limited thereto.

In one embodiment, the import point interception program 3 checks variables of the open call of the interpreter process to acquire the information of the module script file required to be launched, thereby determining whether the module script file exists and confirming the second interception point (step S55). If the module script file required to be launched does not exist, there is no problem of malicious programs, and therefore the import point interception program 3 can directly determine that the test is passed (step S53), and then the whitelisting method ends.

If the module script file required to be launched exists, the import point interception program 3 can further acquire the file extension of the module script file from variables of the open call (step S56), and determine whether the file extension of the module script file matches the file extension restricted by the module loader (step S57). In one embodiment, the file extension restricted by the module loader may be, for example but not limited to, the file extension of Python, such as .py or .pyc, the file extension of Perl, such as .pm, or so on. If the file extension of the module script file does not match the file extension restricted by the module loader, it means the module script file is not a restricted file type (that is, it is determined to be the data file used by the script, and is less likely to be a malicious program), and therefore the import point interception program 3 can determine the detection is passed (step S53). In this condition, the interpreter process can launch the module script file through the module loader.

If the file extension of the module script file matches the file extension restricted by the module loader in the step S57, it means the module script file is a file type restricted by the module loader. In this condition, the import point interception program 3 further checks the whitelist (step S58), and determines whether the module script file exists in the whitelist (step S59).

If the module script file exists in the whitelist, it means that although the module script file is restricted, it is not a malicious program, and therefore the import point interception program 3 can determine that the test is passed (step S53). In this condition, the interpreter process can launch the module script file through the module loader.

If the module script file does not exist in the whitelist in the step S59, it means that the module script file may be script-based malware. In this condition, the import point interception program 3 blocks the module script file (step S60), and therefore the interpreter process cannot launch the module script file through the module loader. In this way, the interpreter process can be prevented from launching malicious script files hidden in approved startup script files to cause damage to the Linux system.

Accordingly, the whitelisting method of the present disclosure can check whether a file to be imported/launched is a script-based file at least two interception points of a process, and determine whether the file exists in the whitelist, thereby blocking the execution of the script-based malware.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A whitelisting method for blocking script-based malware, comprising steps of:
  (a) upon executing an interpreter process, checking a command line of the interpreter process by a startup point interception program to confirm a time point that the interpreter process launches a startup script file as a first interception point responsive to determining that the command line includes corresponding commands for launching the startup script file,
  (b) checking whether the startup script file is in a whitelist at the first interception point,
  (c) determining that a test is passed when the startup script file exists in the whitelist, and launching the startup script file, wherein the startup script file at least comprises a module script file, (d) confirming another time point that the interpreter process invokes a module loader to import and launch the module script file as a second interception point by an import point interception program after the interpreter process launches the startup script file, and (e) checking whether the module loader is allowed to import the module script file, or is allowed to launch the module script file that has been imported by using the whitelist at the second interception point.

2. The whitelisting method as claimed in claim 1, wherein the step (a) comprises steps of:
   (a1) checking the command line of the interpreter process to acquire an invocation name of the interpreter process,
   (a2) determining whether the interpreter process is an interpreter process used to launch the startup script file based on the invocation name, and
   (a3) checking variables of the command line when the interpreter process is the interpreter process used to launch the startup scrip file to confirm the first interception point that the interpreter process launches the startup script file.

3. The whitelisting method as claimed in claim 2, wherein in the step (a3) comprises steps of:
   determining whether the variables of the command line comprise a file path and a file name, and
   determining that the interpreter process launches the startup script file when the variables of the command line comprise the file path and the file name, and confirming the first interception point.

4. The whitelisting method as claimed in claim 1, wherein the startup script file has a metadata; in the step (b), it is to determine that the startup script file exists in the whitelist when the metadata of the startup script file contains a whitelist tag corresponding to the whitelist.

5. The whitelisting method as claimed in claim 1, wherein the step (d) comprises steps of:
   (d11) determining whether the interpreter process invokes the module loader, and
   (d12) executing a check code to confirm the second interception point when the interpreter process invokes the module loader.

6. The whitelisting method as claimed in claim 5, wherein the step (e) comprises steps of:
   (e11) determining whether the module script file to be imported by the module loader exists at the second interception point by executing the check code,
   (e12) checking the whitelist when the module script file exists,
   (e13) determining that the test is passed when the module script file exists in the whitelist, and importing the module script file, and
   (e14) blocking the module script file when the module script file does not exist in the whitelist.

7. The whitelisting method as claimed in claim 6, wherein the step (d12) comprises steps of:
   (d121) intercepting a module loading instruction or syntax and rewriting the module loader when the interpreter process reads an environment variable and invokes the module loader, and
   (d122) executing the check code based on the rewritten module loader.

8. The whitelisting method as claimed in claim 7, wherein in the step (d), it is to check the interpreter process to invoke a command of the module loader, and determine what the module script file is and whether the module script file exists based on content of the command.

9. The whitelisting method as claimed in claim 1, wherein the step (d) comprises steps of:
   (d21) determining whether the interpreter process invokes the module loader, wherein the module loader is a module loader using a restricted file extension, and
   (d22) checking variables of an open call when the interpreter process invokes the module loader to confirm the module script file to be launched and confirm the second interception point.

10. The whitelisting method as claimed in claim 9, wherein the step (e) comprises steps of:
    (e21) determining whether the module script file to be launched by the module loader exists at the second interception point,
    (e22) determining whether a file extension of the module script file matches a file extension restricted by the module loader when the module script file exists,
    (e23) checking the whitelist when the file extension of the module script file matches the file extension restricted by the module loader,
    (e24) determining that a test is passed when the module script file exists in the whitelist, and launching the module script file, and
    (e25) blocking the module script file when the module script file does not exist in the whitelist.

11. The whitelisting method as claimed in claim 10, wherein in the step (e22), it is to check the variables of the open call of the interpreter process to acquire the file extension of the module script file, and compare the file extension of the module script file with the file extension restricted by the module loader.

12. The whitelisting method as claimed in claim 9, wherein the step (d22) further comprises steps of:
    (d221) checking an invocation name of the interpreter process when the interpreter process invokes the module loader to confirm whether the module loader is the module loader using the restricted file extension, and
    (d222) checking variables of the open call of the interpreter process when the module loader is the module loader using the restricted file extension.

* * * * *